May 30, 1967

M. A. AHLENIUS 3,322,410

WATER PURIFICATION UNIT

Filed Feb. 23, 1966

INVENTOR.
MARIE A. AHLENIUS
BY
Dominik & Stein
ATTORNEYS 3,322,410
WATER PURIFICATION UNIT
Marie A. Ahlenius, 7450 N. Greenview Ave.,
Chicago, Ill. 60626
Filed Feb. 23, 1966, Ser. No. 529,584
9 Claims. (Cl. 261—92)

This invention relates in general to water purification units and, in particular, to water purification units for use on small bodies of water such as a pond or lake, to remove surface algae and the like.

It is generally well known that unless there is considerable activity, such as boating, swimming, water skiing and the like, on a lake or the lake has an inlet and an outlet so that the water therein is circulated, the water becomes cloudy and surface algae forms. In other words, the water becomes stagnant. The water purification unit of the present invention is particularly adapted for use on small bodies of water to prevent water stagnation. It has been found that the water purification unit need only be operated several hours a day, preferably each day, to keep a small pond or lake relatively crystal clear.

The water purification unit includes, generally, a paddle wheel which is operated at a predetermined rotational speed to provide a thorough admixture of the surface water and air. The paddle wheel may be driven by an electric or gasoline motor, and may be mounted on pontoons or a float or, alternatively, it can be affixed to a dock or the like. The water purification unit can be operated at any time, however, its operation is most effective if operated before sunrise and at a rotational speed which is sufficient to froth the surface water with bubbles. When operated in this manner, the action of the sun on the bubbled surface precipitates the cleaning of the surface algae.

Accordingly, it is an object of the present invention to provide improved water purification units. More particularly, it is an object to provide a water purification unit which is particularly adapted for use on small bodies of water such as ponds or lakes.

Another object is to provide a water purification unit which may be floated on a float or on pontoons or, alternatively, affixed to a dock or the like.

Still another object is to provide a water purification unit of the type described which is relatively simple in construction, easily maintained, and relatively inexpensively manufactured.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

Figure 1:
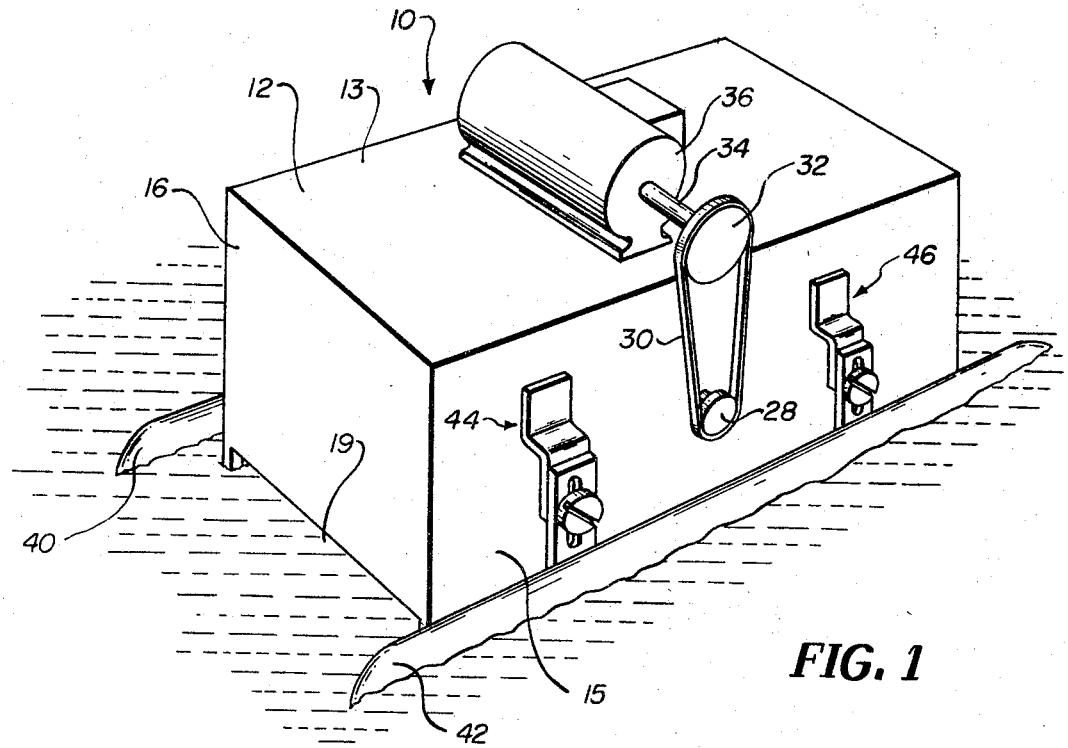
Figure 2:
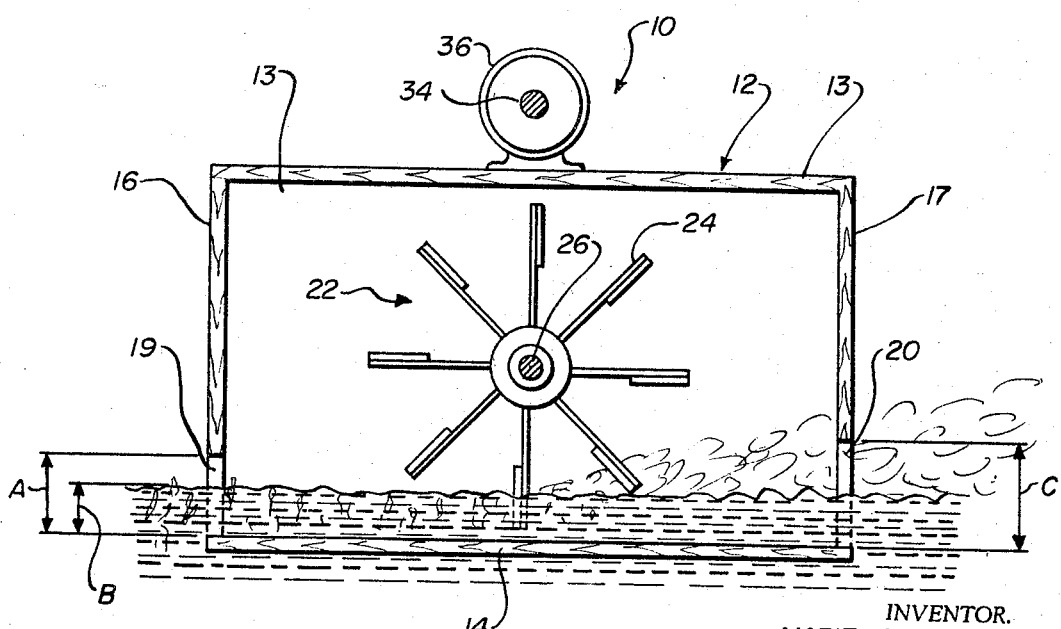

For a fuller understanding of the nature and objects of the invention, reference should be had to the following detailed description taken in connection with the accompanying drawing, in which:

FIG. 1 is a perspective view illustrating a water purification unit exemplary of the present invention, mounted on pontoons; and FIG. 2 is a sectional view of the water purification unit of FIG. 1.

Similar reference characters refer to similar parts throughout the several views of the drawing.

Referring now to the drawing, a water purification unit 10 exemplary of the invention is illustrated including a box 12 having a top wall 13, a bottom wall 14, a pair of side walls 15 (only one of which can be seen) and end walls 16 and 17. A water inlet 19 and a water outlet 20 is provided in the end walls 16 and 17, respectively.

In an operative unit, the water inlet 19 is approximately five inches in height extending from the bottom wall 14 of the unit and the water outlet 20 is approximately six and one-half inches in height and each extended across substantially the full width of the respective end walls 16 and 17. The ratio between the dimensions of the water inlet 19 and water outlet 20 is critical, and must be one which permits water to be easily drawn into the unit, churned or bubbled up and expelled from the unit. It has been established that this ratio must be within the range of 1.2:1 to 1.4:1 for the dimension of the water outlet to that of the water inlet. The heights and widths of the water inlet 19 and water outlet 20 set forth above have been found to provide the desired results. A paddle wheel 22 having a number of paddles 24 is rotatably mounted by means of an axle 26 within the interior of the box 12. A gear 28 is affixed to the axle 26 exteriorly of the box 12 and is drivingly coupled by means of a chain 30 to a gear 32 affixed to the drive shaft 34 of motor means 36. The motor means 36 is fixedly mounted upon the top wall 13 of the box 12, and may be an electric motor or a gasoline motor of a sufficient horsepower to rotate the paddle wheel 22, in the manner hereinafter described.

The water purification unit 10 is placed in the water and, for proper operation, its height must be adjusted to establish the water level at the mid-point, or slightly above, the mid-point of the water inlet 19. The paddle wheel 22 must be centrally disposed between the side walls 15 and the end walls 16 and 17, otherwise the unit 10 will not function properly to provide satisfactory results. Also, its paddles 24 should be of sufficient length to extend well into the water when the water level is established, as described, but the height and width of the overall dimensions of the paddle wheel should not be greater than 70–75% of the height and width of the box 12. If the paddle wheel exceeds these dimensions, the flow of water through, and the admixture of surface water and air in the box 12 is inadequate to provide efficient and satisfactory operation. In the above mentioned operative unit, the box 12 measured approximately eighteen inches in length, nineteen inches in height and twelve inches in width. The paddle wheel 22 has a width of approximately 8½ inches and an overall diameter of approximately fourteen inches, and is centrally disposed between each of its opposite pairs of walls.

The water level may be established by fixedly mounting the unit 10 to a dock or the like which extends into the water or, alternatively, the unit 10 can be mounted on a float or a pair of pontoons, such as the pontoons 40 and 42, illustrated in FIG. 1. For this purpose, the water purification unit 10 can have a pair of adjustable bracket assemblies 44 and 46 fixedly secured to one or both of its side walls 15 for adjustably affixing the unit to the dock, float or pontoons.

In operation, the water purification unit 10 is placed in the body of water, and its height adjusted so that the water level is established as described above. The motor means 36 is energized to rotate the paddle wheel 22. A critical speed of rotation of 600 r.p.m. has been established for proper operation. At this rotational speed, the water is drawn in through the water inlet 19 by the paddle wheel 22 and is sufficiently agitated to provide a thorough admixture of the surface water and air and a frothing of bubbles is expelled from the water outlet 20 onto the surface of the body of water. The frothing on the surface eventually disappears, due to the bubbles bursting and/or evaporating and, in doing so the surface algae is carried away also. The action of the sun on the bubbled surface enhances the precipitation of the surface algae and, accordingly, the operation of the water purification unit is most effective if initiated before sunrise and thereafter.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A water purification unit for use on a small body of water such as a pond or lake comprising a substantially closed box-like structure having top, bottom, side and end walls, a water inlet and a water outlet in respective ones of said end walls extending upwardly from the bottom wall of said structure and across substantially the entire width of said end walls, paddle wheel means rotatably mounted within said structure, and motor means secured to the top wall of said structure and coupled to said paddle wheel means for rotating it, and means for adjustably mounting said unit so that the water level is established at least at the midpoint of said water inlet, said paddle wheel means extending into said water and being operated at a rotational speed sufficient to draw said water into said unit for agitating said water to provide an admixture of water and air and for expelling the admixture through said water outlet.

2. The water purification unit of claim 1 wherein said motor means comprises an electric motor.

3. The water purification unit of claim 1 wherein said motor means comprises a gasoline engine.

4. The water purification unit of claim 1 wherein said mounting means comprises means for adjustably affixing said unit to a dock and the like, whereby the water level at the water inlet can be adjustably established.

5. The water purification unit of claim 1 wherein said mounting means comprises float means adjustably affixed to said unit, whereby said unit can float in said body of water and the water level at the water inlet can be adjustably established.

6. The water purification unit of claim 5 wherein said float means comprises a pair of pontoons adjustably affixed to the opposite side walls of said structure.

7. The water purification unit of claim 1 wherein the ratio between the dimensions of said water outlet and said water inlet is within a range of 1.2–1 to 1.4–1.

8. The water purification unit of claim 1 wherein the height and width of said paddle wheel is less than 70–75 percent of the height and width of said box-like structure.

9. The water purification unit of claim 1 wherein said paddle wheel is operated at a rotational speed of 600 r.p.m.

References Cited
UNITED STATES PATENTS

| | | | |
|---|---|---|---|
| 181,336 | 8/1876 | Hartzell | 210—242 |
| 3,198,000 | 8/1965 | Schlageter | 261—92 X |

REUBEN FRIEDMAN, *Primary Examiner.*

J. L. DE CESARE, *Assistant Examiner.*